(12) United States Patent
Hatakeyama et al.

(10) Patent No.: US 12,560,624 B2
(45) Date of Patent: Feb. 24, 2026

(54) AUTOMATIC ANALYZER

(71) Applicant: Hitachi High-Tech Corporation, Tokyo (JP)

(72) Inventors: Koji Hatakeyama, Tokyo (JP); Satoru Yamamoto, Tokyo (JP); Hidetsugu Tanoue, Tokyo (JP); Hiroki Nakano, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 453 days.

(21) Appl. No.: 18/023,468

(22) PCT Filed: Feb. 12, 2021

(86) PCT No.: PCT/JP2021/005312
§ 371 (c)(1),
(2) Date: Feb. 27, 2023

(87) PCT Pub. No.: WO2022/064730
PCT Pub. Date: Mar. 31, 2022

(65) Prior Publication Data
US 2023/0358776 A1 Nov. 9, 2023

(30) Foreign Application Priority Data
Sep. 24, 2020 (JP) ................................. 2020-159495

(51) Int. Cl.
*G01N 35/10* (2006.01)
*G01N 35/00* (2006.01)
*G01N 35/02* (2006.01)

(52) U.S. Cl.
CPC ... *G01N 35/1072* (2013.01); *G01N 35/00663* (2013.01); *G01N 35/025* (2013.01);
(Continued)

(58) Field of Classification Search
CPC ......... G01N 35/1072; G01N 35/00663; G01N 35/025; G01N 2035/00356;
(Continued)

(56) References Cited

U.S. PATENT DOCUMENTS 10,746,748 B2 * 8/2020 Yabutani .............. G01N 35/025
2002/0110817 A1 * 8/2002 Tajima ............. G01N 33/54366
435/6.1
(Continued)

FOREIGN PATENT DOCUMENTS

JP 62-51256 U 3/1987
JP 62-163968 A 7/1987
(Continued)

OTHER PUBLICATIONS

International Search Report (PCT/ISA/210) issued in PCT Application No. PCT/JP2021/005312 dated Apr. 6, 2021 with English translation (six (6) pages).
(Continued)

*Primary Examiner* — Christine T Mui
(74) *Attorney, Agent, or Firm* — Crowell & Moring LLP

(57) ABSTRACT

An automatic analyzer capable of confirming the amount of sample aspirated by a sample dispensing unit is provided. The automatic analyzer includes an incubator which holds a reaction container in which a liquid mixture of the sample and a reagent is accommodated, a sample dispensing unit which dispenses the sample by aspirating the sample from a sample container in which the sample is accommodated and storing the aspirated sample in a storage portion and then discharging the sample to the reaction container, and a measurement portion which measures the amount of sample in the storage portion on the basis of a detected signal obtained by detecting light passing through the storage portion while irradiating the storage portion with light.

14 Claims, 9 Drawing Sheets

(52) U.S. Cl.
CPC .............. *G01N 2035/00356* (2013.01); *G01N 2035/1076* (2013.01)

(58) Field of Classification Search
CPC .......... G01N 2035/1076; G01N 15/05; G01N 21/359; G01N 21/6452; G01N 35/1016; G01N 2035/1025; G01N 2035/1062
USPC ........................................................ 422/64
See application file for complete search history.

(56) References Cited

U.S. PATENT DOCUMENTS

| | | | | |
|---|---|---|---|---|
| 2003/0075556 A1* | 4/2003 | Tajima | ............... | G01N 35/1016 222/23 |
| 2019/0120682 A1 | 4/2019 | Ziegler et al. | | |
| 2019/0346475 A1* | 11/2019 | Hämäläinen | ........ | G01F 23/2928 |
| 2019/0383793 A1 | 12/2019 | Sugiyama et al. | | |
| 2024/0203140 A1 | 6/2024 | Mizutani et al. | | |

FOREIGN PATENT DOCUMENTS

| | | | | | |
|---|---|---|---|---|---|
| JP | 2004-347513 A | 12/2004 | | | |
| JP | 2013-113652 A | 6/2013 | | | |
| JP | 2019-500585 A | 1/2019 | | | |
| JP | 2019-23665 A | 2/2019 | | | |
| JP | 2019-520584 A | 7/2019 | | | |
| WO | WO-2016152305 A1 * | 9/2016 | ......... | G01N 35/1011 |
| WO | WO 2018/105224 A1 | 6/2018 | | | |

OTHER PUBLICATIONS

Japanese-language Written Opinion (PCT/ISA/237) issued in PCT Application No. PCT/JP2021/005312 dated Apr. 6, 2021 (four (4) pages).

International Preliminary Report on Patentability (PCT/IPEA/409) issued in PCT Application No. PCT/JP2021/005312 dated Apr. 15, 2022, including Annexes with English translation (14 pages).

Extended European Search Report issued in European Application No. 21871867.4 dated Aug. 30, 2024 (11 pages).

\* cited by examiner

[FIG. 1]
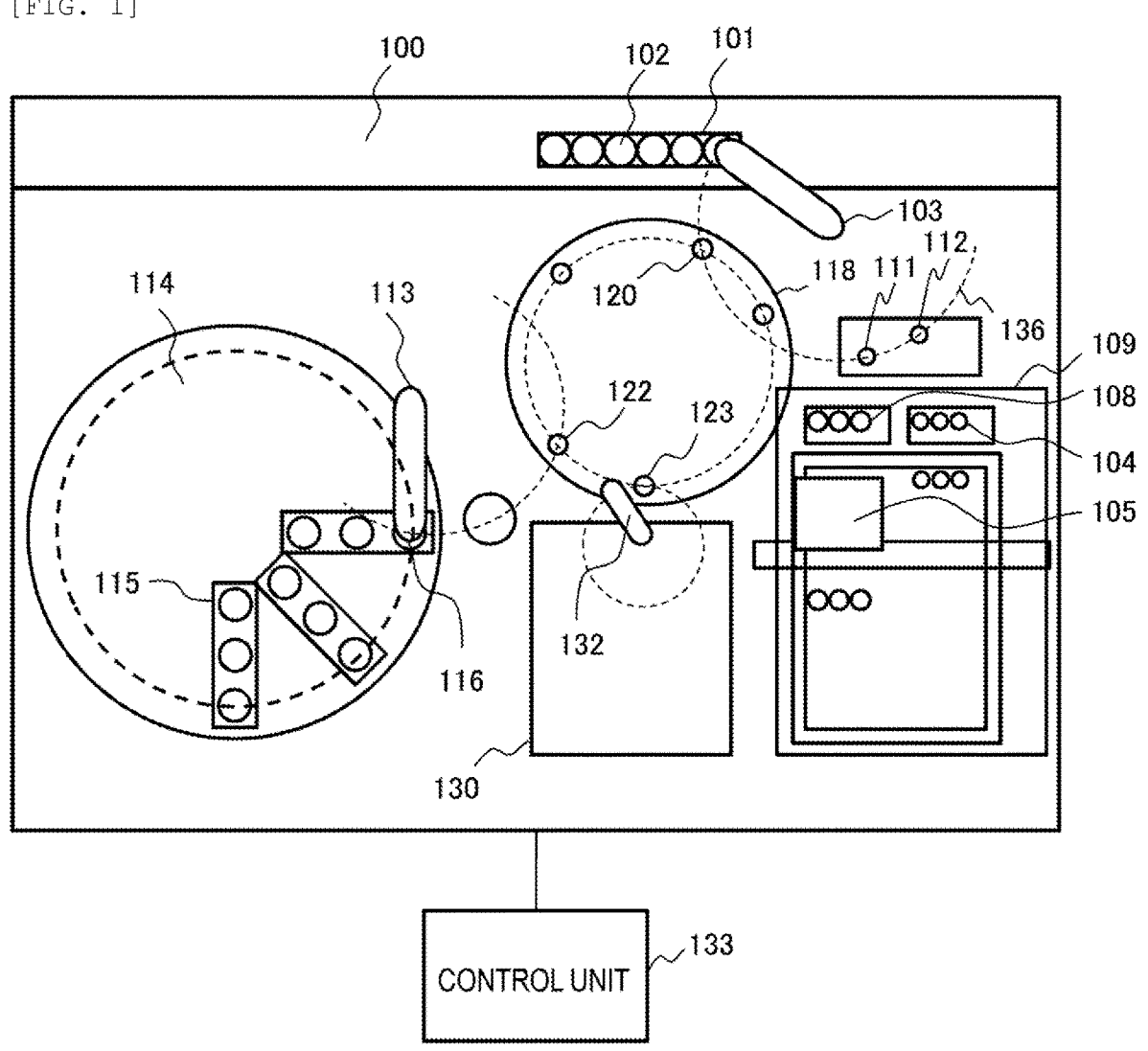

[FIG. 2]
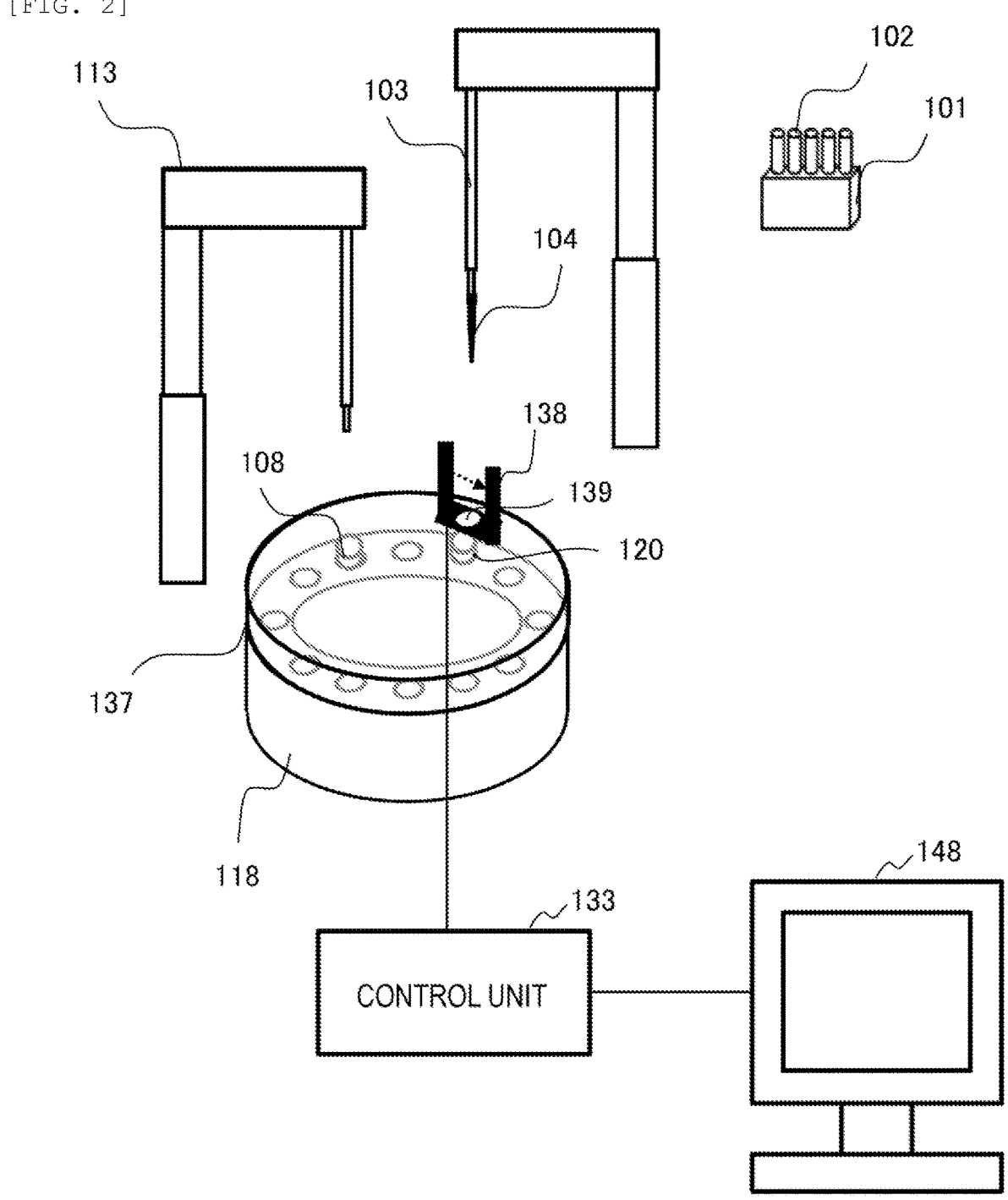

[FIG. 3]
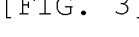

[FIG. 4]

[FIG. 5]
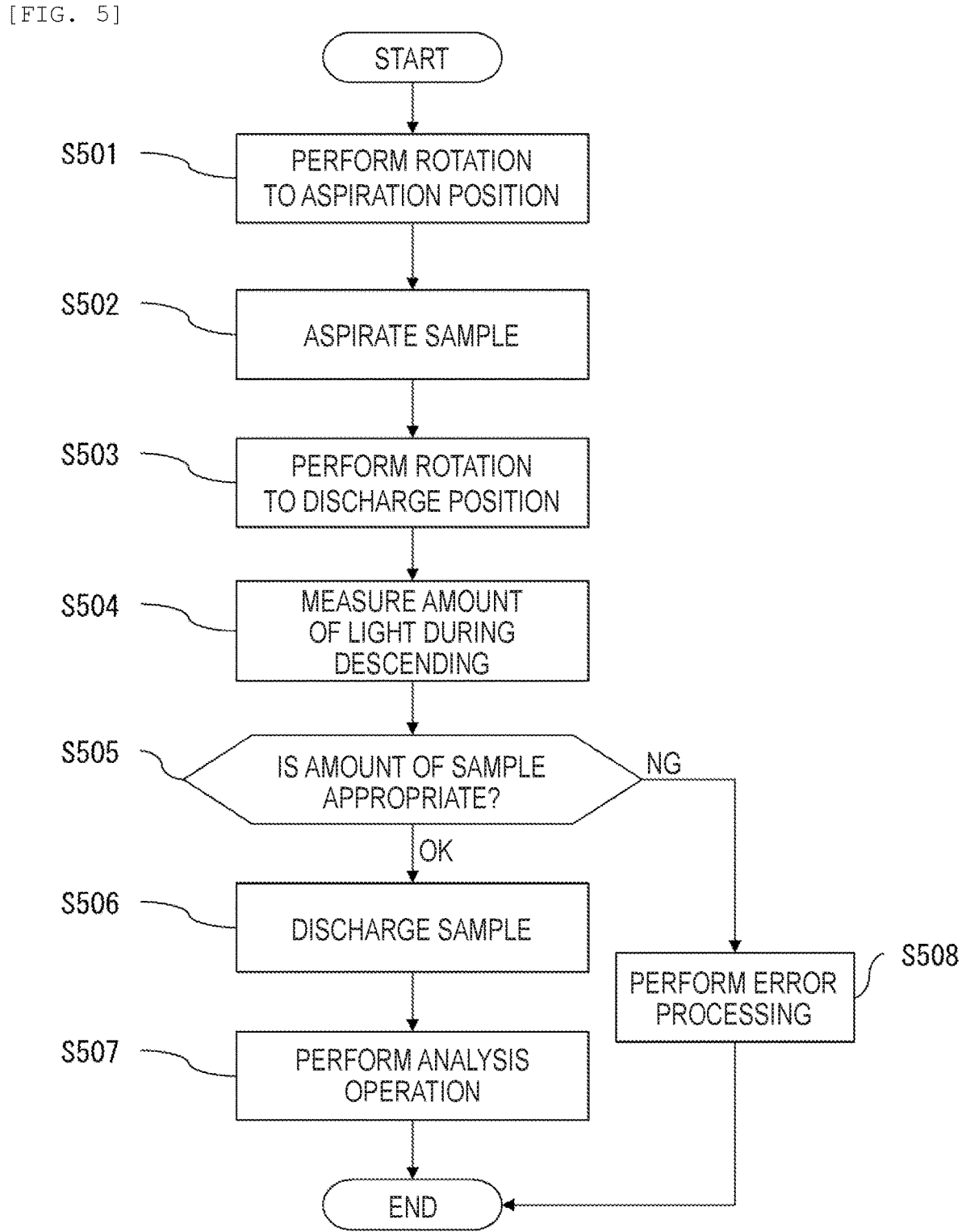

[FIG. 6]
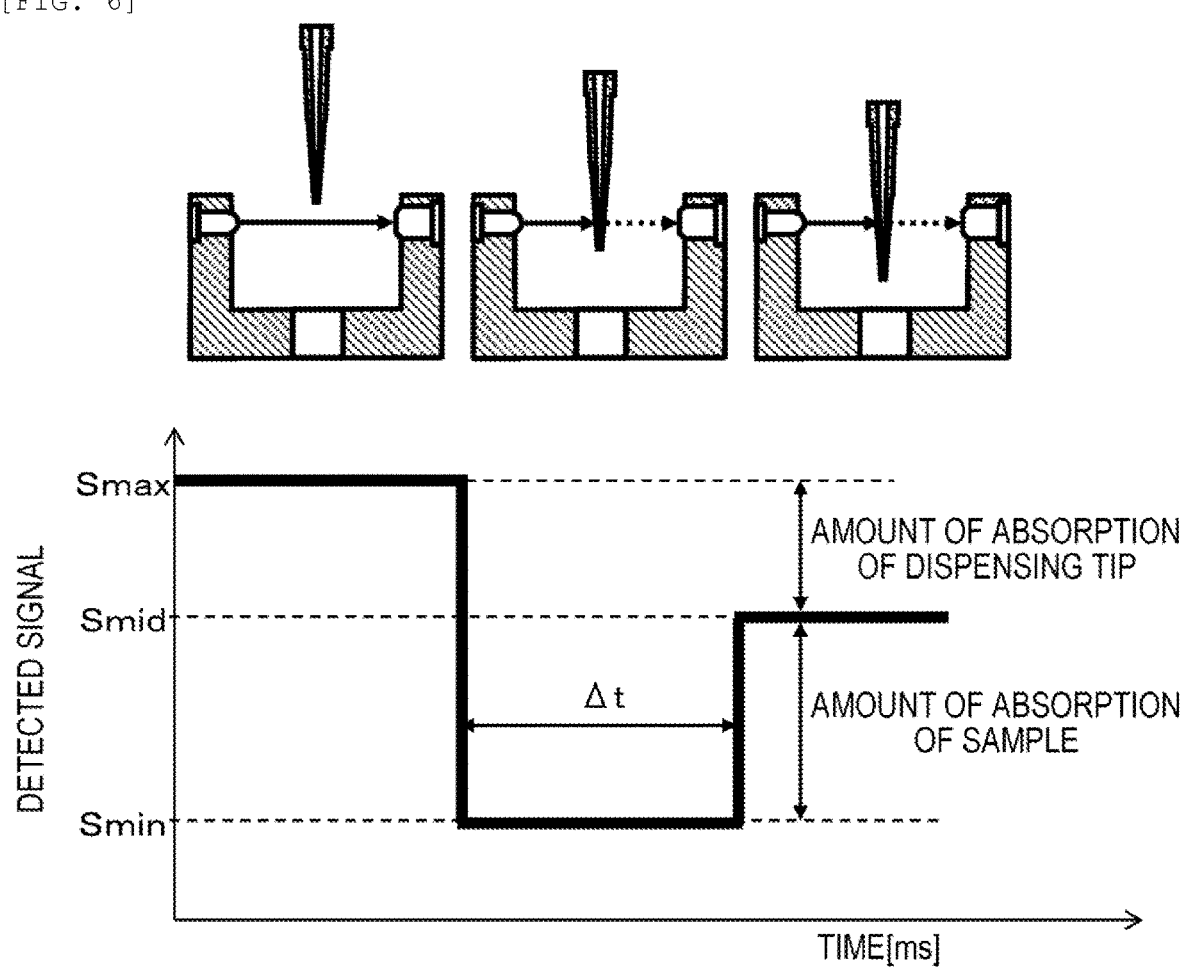

[FIG. 7]
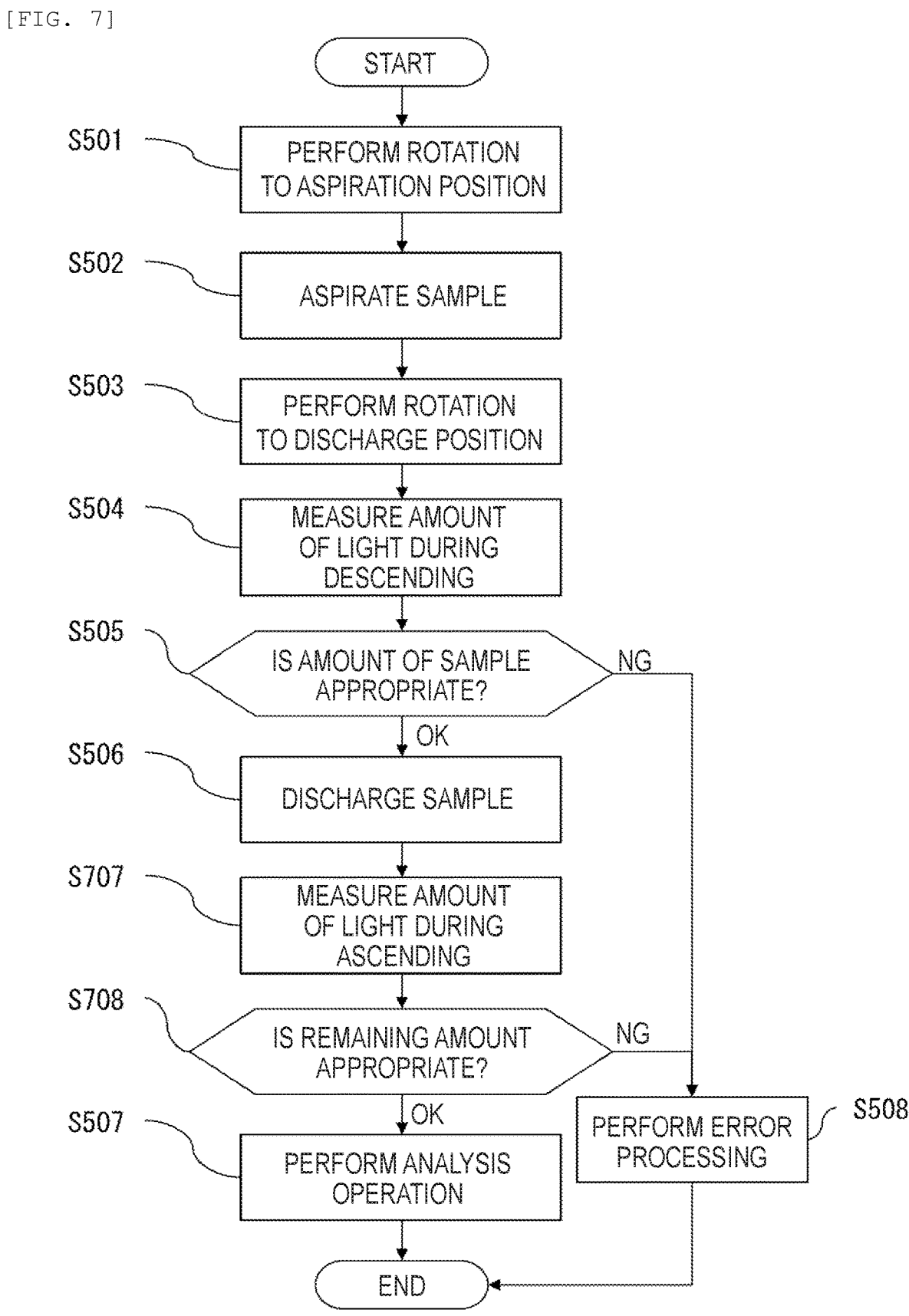

[FIG. 8]
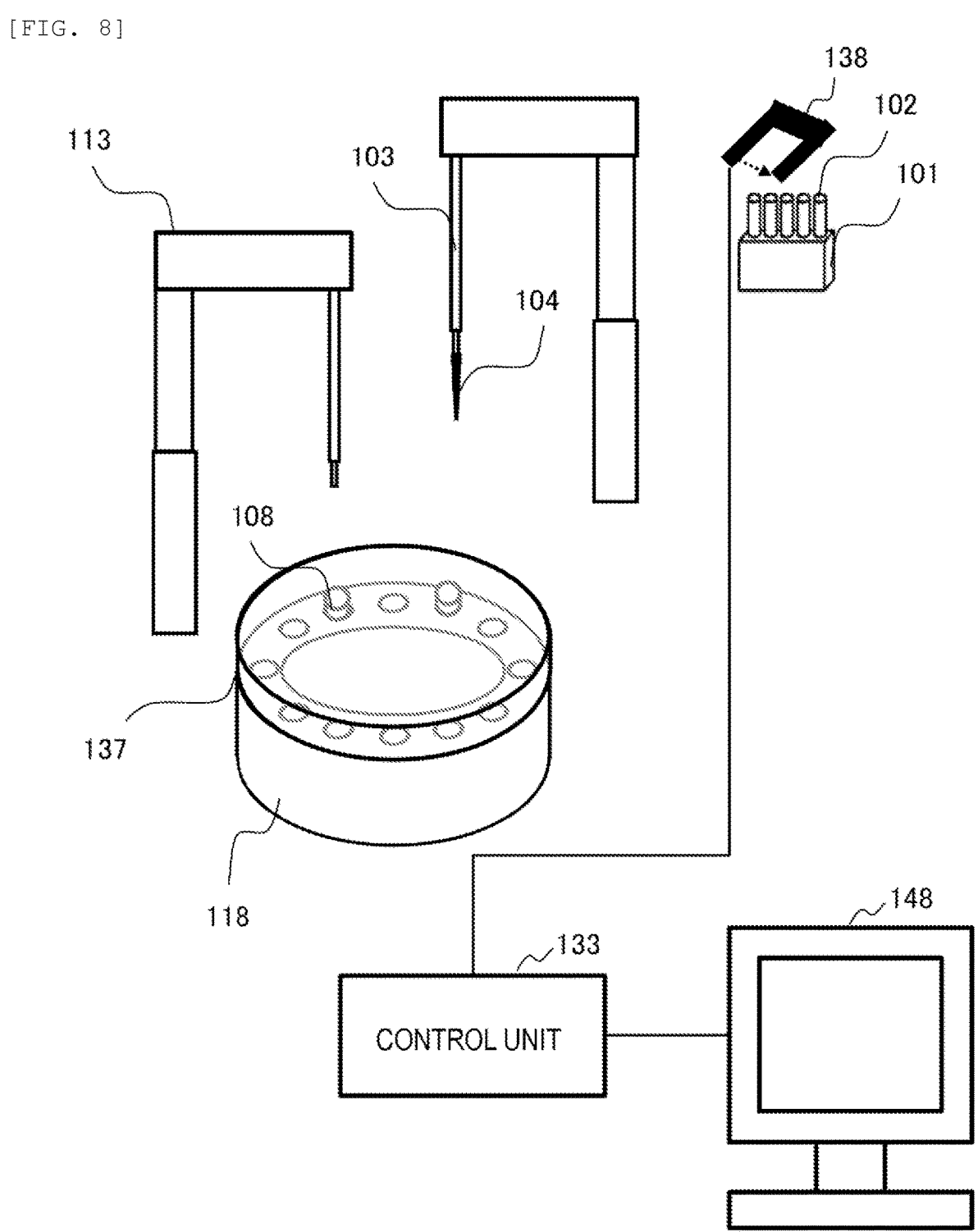

[FIG. 9]
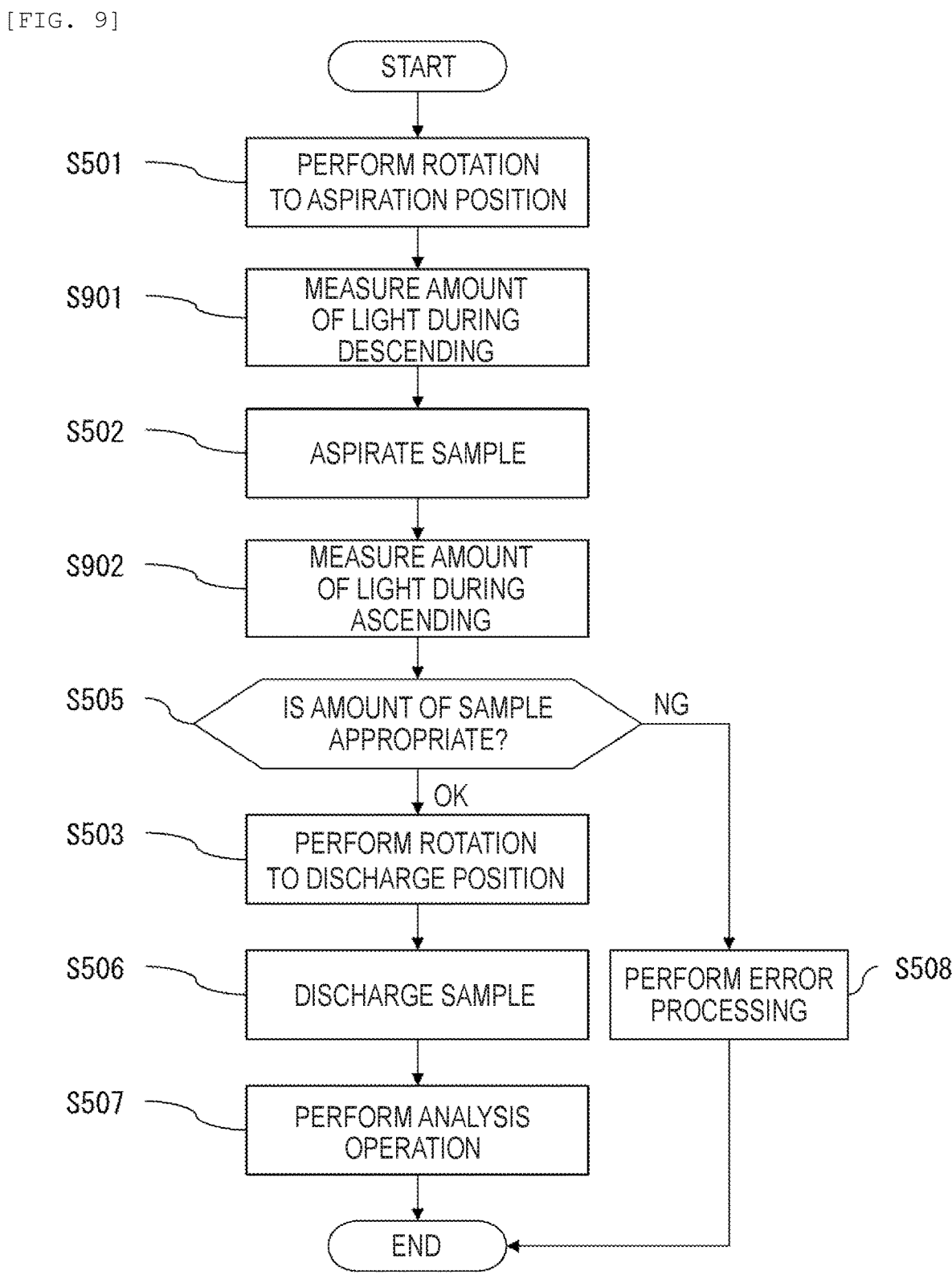

AUTOMATIC ANALYZER

TECHNICAL FIELD

The present invention relates to automatic analyzers.

BACKGROUND ART

An automatic analyzer, which analyzes a sample such as blood or urine supplied from a patient, is used in hospitals or testing facilities. When the sample is blood, the blood is separated into plasma and blood cells in a sample container by a centrifuge or the like, and a horizontal interface between the plasma and the air needs to be detected to dispense and analyze only the plasma. A liquid level sensor or an optical sensor is used to detect the horizontal interface between the plasma and the air. A foam being a mixed layer of the two may be produced between the plasma and the air by vibrations during transfer of the sample container. If the amount of the foam is large, the foam must be removed, for example, by blowing air into the sample container before relevant processing proceeds to an analysis process.

Patent Literature 1 discloses an automatic analyzer, which determines whether or not to proceed to the analysis process depending on whether a difference between a horizontal interface, detected by the liquid level sensor, between the air and the foam or the plasma and a horizontal interface, detected by the optical sensor, between the air or the foam and the plasma is less than a threshold. When no foam is produced, the horizontal interface between the air and the plasma is detected by the two sensors.

CITATION LIST

Patent Literature

Patent Literature 1: Japanese Unexamined Patent Application Publication (Translation of PCT Application) No. 2019-520584.

SUMMARY OF INVENTION

Technical Problem

However, Patent Literature 1 gives no consideration to checking the amount of a sample aspirated by a sample dispensing unit dispensing the sample. Even if the horizontal interface between the air and the sample is accurately detected, if an inappropriate amount of the sample is aspirated by the sample dispensing unit, precision of analysis may be deteriorated.

An object of the invention is therefore to provide an automatic analyzer capable of checking the amount of a sample aspirated by a sample dispensing unit.

Solution to Problem

To achieve the object, the invention provides an automatic analyzer that analyzes a sample, the automatic analyzer including an incubator that holds a reaction container in which a liquid mixture of the sample and a reagent is accommodated, a sample dispensing unit that dispenses the sample by aspirating the sample from a sample container in which the sample is accommodated and storing the aspirated sample in a storage portion and then discharging the sample to the reaction container, and a measurement portion that measures the amount of the sample in the storage portion on the basis of a detected signal obtained by detecting light passing through the storage portion while irradiating the storage portion with light.

Advantageous Effects of Invention

According to the invention, it is possible to provide an automatic analyzer capable of checking the amount of a sample aspirated by a sample dispensing unit.

BRIEF DESCRIPTION OF DRAWINGS

FIG. 1 is a schematic view illustrating a configuration example of an automatic analyzer.

FIG. 2 is a perspective view illustrating a measurement portion disposed on an incubator.

FIG. 3 is a diagram illustrating examples of a dispensing tip in which a sample is not stored, and the measurement portion.

FIG. 4 is a diagram illustrating examples of the dispensing tip in which a sample is stored, and the measurement portion.

FIG. 5 is a diagram illustrating an example of a flow of processing in Example 1.

FIG. 6 is a diagram illustrating an example of changes in a detected signal over time when the dispensing tip storing a sample descends.

FIG. 7 is a diagram illustrating an example of a flow of processing in Example 2.

FIG. 8 is a perspective view illustrating a measurement portion disposed on a sample container.

FIG. 9 is a diagram illustrating an example of a flow of processing in Example 3.

DESCRIPTION OF EMBODIMENTS

Hereinafter, some preferred embodiments of an automatic analyzer according to the invention will be described with reference to the accompanying drawings. In the following description and the accompanying drawings, components having the same functional configuration are designated by the same reference numeral or sign, and thus repeated description is omitted.

First Embodiment

An exemplary overall configuration of the automatic analyzer is described with reference to FIG. 1. The automatic analyzer analyzes a sample such as blood or urine supplied from a patient, and includes a rack conveyance path 100, a tray 109, a reagent disc 114, an incubator 118, an analysis unit 130, and a control unit 133. Each unit or portion is now described.

The rack conveyance path 100 conveys a sample rack 101 to mount a plurality of sample containers 102, each accommodating a sample, to a position that can be accessed by a sample dispensing unit 103. The sample accommodated in the sample container 102 is dispensed by the sample dispensing unit 103 to a reaction container 108 held in the incubator 118. The sample dispensing unit 103 performs rotational transfer in a horizontal plane and up and down movement in a vertical direction.

Expendable items such as a reaction container 108 and a dispensing tip 104 are arranged on the tray 109. The reaction container 108 is conveyed from the tray 109 to the incubator 118 by an expandable item conveyance portion 105 and used to accommodate a liquid mixture of a sample and a reagent.

The dispensing tip 104 is conveyed by the expendable item conveyance portion 105 from the tray 109 to a tip mounting position 111 and attached to a tip end of a probe of the sample dispensing unit 103 at the tip mounting position 111, and used for dispensing of the sample. To prevent carry-over of the sample, the dispensing tip 104 is replaced every time the sample dispensing unit 103 dispenses the sample, and the used dispensing tip 104 is discarded into the disposal hole 112. The sample dispensing unit 103 with the dispensing tip 104 attached to the probe tip end aspirates the sample from the sample container 102, stores the aspirated sample in the dispensing tip 104, and discharges the stored sample to the reaction container 108 disposed at a sample dispensing position 120. The tip mounting position 111, the sample dispensing position 120, and the disposal hole 112 are arranged on a turning track 136 of the sample dispensing unit 103.

The reagent disc 114 stores a plurality of reagent containers 115 each accommodating a reagent. The inside of the reagent disc 114 is kept at a lower temperature than room temperature to reduce deterioration of the reagent. The reagent accommodated in the reagent container 115 is dispensed by a reagent dispensing unit 113 to the reaction container 108 into which the sample has been dispensed. The reagent dispensing unit 113 aspirates the reagent from the reagent container 115 transferred to a reagent aspiration position 116 by rotation of the reagent disc, and dispenses the reagent by discharging the reagent to the reaction container 108 disposed at a reagent dispensing position 122. The reagent dispensing unit 113 also performs rotational transfer and up and down movement like the sample dispensing unit 103.

The incubator 118 holds a plurality of reaction containers 108, each accommodating the liquid mixture of the sample and the reagent, and is maintained within a predetermined temperature range. A reaction of the liquid mixture accommodated in the reaction container 108 proceeds by keeping the incubator 118 at a predetermined temperature, so that the liquid mixture becomes a reaction liquid used for analysis. The respective reaction containers 108 arranged along the outer periphery of the circular incubator 118 are transferred by rotation of the incubator 118 to the sample dispensing position 120, the reagent dispensing position 122, and a reaction liquid aspiration position 123.

The analysis unit 130 analyzes the reaction liquid accommodated in the reaction container 108. The reaction liquid to be analyzed is aspirated by a reaction liquid aspiration portion 132 from the reaction container 108 transferred to the reaction liquid aspiration position 123, and fed to the analysis unit 130. The reaction liquid fed to the analysis unit 130 is subjected to measurement of luminescence amount of a fluorescent material.

The control unit 133 controls the operation of each unit, receives data necessary for analysis, and displays or stores results of analysis. The control unit 133 may be dedicated hardware such as Application Specific Integrated Circuit (ASIC) or Field-Programmable Gate Array (FPGA), or may be a computer having Micro-Processing Unit (MPU) that executes software.

The amount of the sample contained in the reaction liquid analyzed by the analysis unit 130 corresponds to the amount of the sample aspirated and dispensed by the sample dispensing unit 103, and if the amount of the aspirated sample is not appropriate, accuracy of analysis may be deteriorated. In the first embodiment, therefore, a measurement portion is provided for measuring the amount of the sample stored in the dispensing tip 104 attached to the probe tip end of the sample dispensing unit 103.

An exemplary configuration including a measurement portion 138 disposed on the incubator 118 is described with reference to FIG. 2. The measurement portion 138 is provided at the sample dispensing position 120. Since a cover 137 is provided on the incubator 118 to suppress contamination of a foreign matter into the reaction container 108, the measurement portion 138 is provided on the cover 137. Even if the incubator 118 rotates, the cover 137 remains stationary without rotation. The cover 137 has holes at the sample dispensing position 120, the reagent dispensing position 122, and the reaction liquid aspiration position 123, the holes having inner diameters larger than the outer diameters of the probes of the sample dispensing unit 103, the reagent dispensing unit 113, and the reaction liquid aspiration portion 132, respectively. The measurement portion 138 also has a passing hole 139 with an inner diameter larger than the outer diameter of the probe of the sample dispensing unit 103. Specifically, the sample dispensing unit 103 dispenses the sample to the reaction container 108 through the hole provided at the sample dispensing position 120. A detected signal acquired by the measurement portion 138 is transmitted to the control unit 133. The control unit 133 controls operation of each unit or portion according to the received detected signal, and displays various messages on a display portion 148 such as a liquid crystal display.

Figure 4:
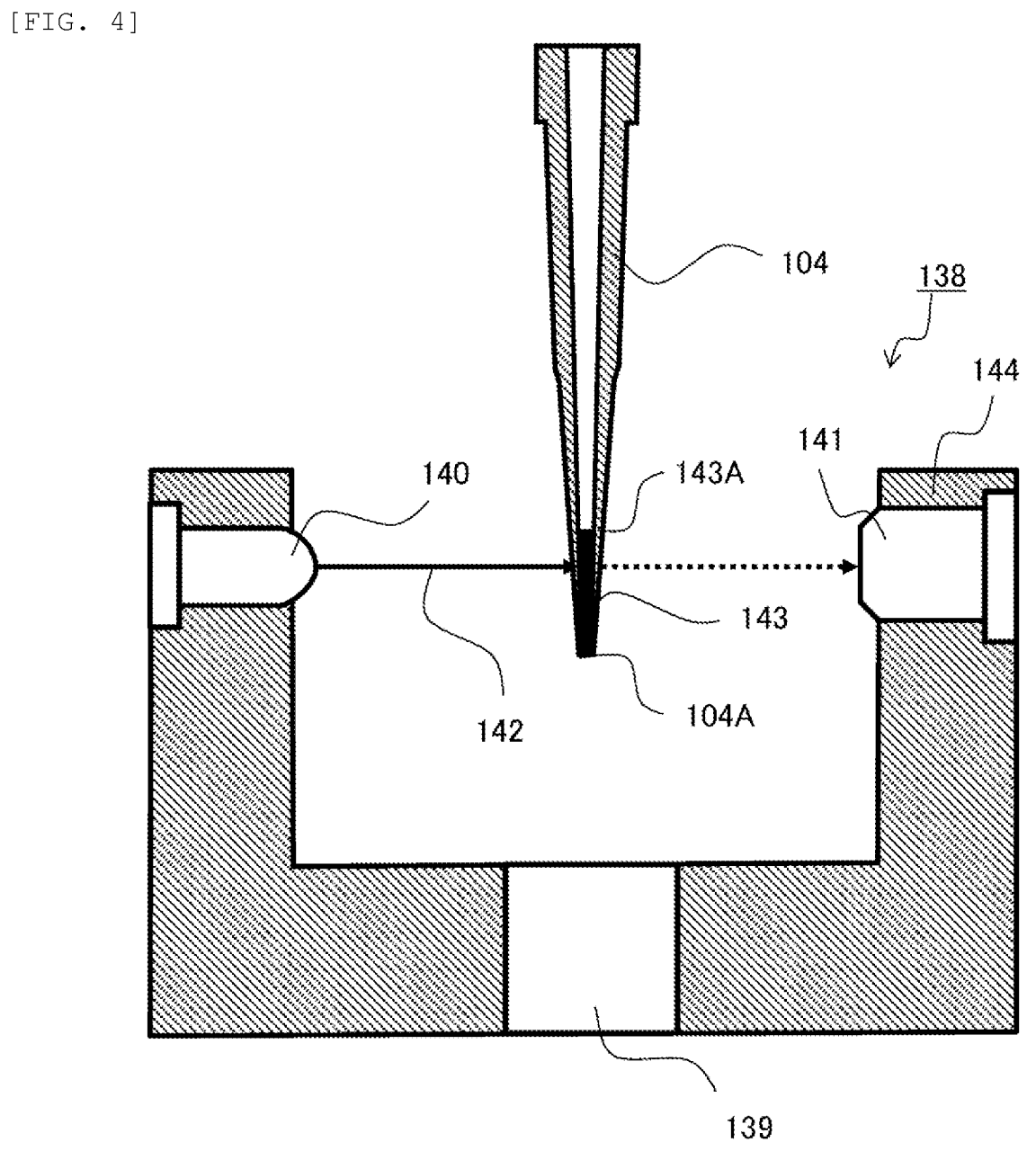

A structure of the measurement portion 138 is described with reference to FIGS. 3 and 4. The measurement portion 138 includes a light irradiation portion 140, a light detection portion 141, and a supporting portion 144. Each portion is described below.

The light irradiation portion 140 is a light-emitting element such as a light-emitting diode that emits irradiation light 142 in a horizontal direction. The irradiation light 142 has a wavelength passing through the dispensing tip 104 and absorbed by a sample 143. The wavelength of the irradiation light 142 may be selected depending on material of the dispensing tip 104 or a type of the sample. For example, when the material of the dispensing tip 104 is a translucent, for example, white, plastic resin such as polyethylene or polystyrene, and when the sample 143 contains water, near-infrared rays having a wavelength of about 1940 nm is selected so as to pass through the plastic resin and be absorbed by the water.

The light detection portion 141 is a light receiving element, such as a photodiode, that detects the irradiation light 142, and is supported together with the light irradiation portion 140 by the supporting portion 144, and disposed opposite to the light irradiation portion 140 in the horizontal direction.

The supporting portion 144 is a U-shaped member to support the light irradiation portion 140 and the light detection portion 141 such that the two portions are at the same height in the vertical direction. The passing hole 139 is provided in the bottom of the supporting portion 144.

A dispensing tip 104 is caused to pass between the light irradiation portion 140 and the light detection portion 141, and the light detection portion 141 outputs a detected signal that changes depending on whether the sample 143 is present in the passing dispensing tip 104. Specifically, the detected signal is lower when the sample 143 is present in the dispensing tip 104 than when the sample 143 is not present therein. The detected signal changes significantly when a tip end 104A of the dispensing tip 104 passes between the light irradiation portion 140 and the light detection portion 141 and when a liquid level 143A of the sample 143 passes between the portions. The irradiation light 142 is directly incident on the light detection portion 141 before passage of the dispensing tip 104 therebetween, causing the detected signal to be maximal.

An exemplary flow of processing of the first embodiment is described for each step with reference to FIG. 5.

(S501)

The sample dispensing unit 103 rotationally transfers to a position where the sample is aspirated, i.e., to a position of the sample container 102 mounted in the sample rack 101.

(S502)

The sample dispensing unit 103 aspirates the sample from the sample container 102. The dispensing tip 104 is beforehand attached to the sample dispensing unit 103.

(S503)

The sample dispensing unit 103 rotationally transfers to a position where the sample is discharged, i.e., to the sample dispensing position 120.

(S504)

The sample dispensing unit 103 descends at the sample dispensing position 120. The measurement portion 138 measures the quantity of light during descending of the sample dispensing unit 103 and outputs a detected signal to the control unit 133. The control unit 133 receives the detected signal output from the measurement portion 138 from time to time and records the signal as changes in the detected signal over time.

FIG. 6 is used to describe the changes in the detected signal over time when the dispensing tip 104 including the sample 143 passes between the light irradiation portion 140 and the light detection portion 141. To simplify the description, the region between the light irradiation portion 140 and the light detection portion 141 is divided into three: before passage of the dispensing tip 104, during passage of a region between the tip end 104A and the liquid level 143A, and after passage of the liquid level 143A.

First, before passage of the dispensing tip 104, since the irradiation light 142 is directly incident on the light detection portion 141, the detected signal shows a maximum value Smax. Subsequently, during passage of a region between the tip end 104A and the liquid level 143A, since the irradiation light 142 is absorbed by the dispensing tip 104 and the sample 143, the detected signal lowers to Smin. The period Δt during which the detected signal shows Smin corresponds to time from when the tip end 104A has passed between the light irradiation portion 140 and the light detection portion 141 to when the liquid level 143A has passed therebetween. Finally, after the liquid level 143A has passed, although the dispensing tip 104 absorbs the light, the sample 143 does not absorb the light, and thus the detected signal increases to Smid.

The control unit 133 calculates the amount of the sample 143 stored in the dispensing tip 104 based on the changes in the detected signal over time as illustrated in FIG. 6. For example, the following equation is used to calculate the amount V of the sample 143.

$$V = \Delta t \cdot v \cdot S \quad (1)$$

where, Δt is time from when the tip end 104A has passed between the light irradiation portion 140 and the light detection portion 141 to when the liquid level 143A has passed therebetween, v is descending speed of the sample dispensing unit 103, and S is cross-sectional area of a bore of the dispensing 104 tip.

If the cross-sectional area of the bore of the dispensing tip 104 changes depending on a vertical position z, the cross-sectional area is treated as a function of z, S(z). Further, when the descending speed of the sample dispensing unit 103 changes depending on the position z, the descending speed is also treated as a function of z, v(z). To calculate Δt, arithmetic processing may be performed on the changes in the detected signal over time. For example, a curve representing the changes in the detected signal over time may be differentiated by time to calculate a time difference, Δt, between time at which a curve obtained by the differentiation is minimized and time at which the curve is maximized.

(S505)

The control unit 133 determines whether the amount of the sample 143 calculated in S504 is appropriate. If the amount is appropriate, the processing proceeds to S506, and if not, the processing proceeds to S508. Whether the amount is appropriate is determined based on a difference between the dispensing amount predetermined for each analysis and the amount of the sample 143 calculated in S504. Specifically, if the difference between the two is less than a threshold, the amount is determined to be appropriate, and if the difference is equal to or larger than the threshold, the amount is determined to be not appropriate.

(S506)

The sample dispensing unit 103 dispenses the sample to the reaction container 108 disposed at the sample dispensing position 120.

(S507)

The control unit 133 controls operation of each unit or portion to continue analysis operation. Specifically, the control unit 133 causes the reagent to be dispensed into the reaction container 108 into which the sample has been dispensed, causes the incubator 118 to produce the reaction liquid, and causes the analysis unit 130 to measure the luminescence amount of a fluorescent material in the reaction liquid.

(S508)

The control unit 133 controls operation of each unit or portion to perform error handling. Specifically, the control unit 133 causes the sample dispensing unit 103 to be raised without discharging the sample to the reaction container 108 disposed at the sample dispensing position 120, causes the sample in the dispensing tip 104 to be discarded, or causes the display portion 148 to display a message indicating that analysis is not allowed. Further, to reperform the analysis, the processing may be restarted from S501 by the sample dispensing unit 103 in which the dispensing tip 104 has been replaced.

According to the described processing flow, it is possible to check the amount of the sample 143 aspirated by the sample dispensing unit 103. Further, if the checked amount of the sample 143 is not appropriate, the analysis can be reperformed. In addition, since the measurement portion 138 is disposed on the movement path of the sample dispensing unit 103, the amount of the sample 143 can be checked without stopping operation associated with dispensing of the sample.

Second Embodiment

In the first embodiment, it has been described that the amount of the sample 143 in the dispensing tip 104 is measured in the process where the sample dispensing unit 103 is descending toward the reaction container 108. All the samples 143 stored in the dispensing tip 104 are however not necessarily discharged to the reaction container 108, and some sample may not be discharged for some reason. In a second embodiment, therefore, it is described that the remaining amount of the sample 143 in the dispensing tip 104 is checked after the sample 143 is discharged. The second embodiment is the same as the first embodiment except for the flow of processing, and thus repeated description is omitted.

The flow of temperature control processing of the second embodiment is described for each step with reference to FIG. 7.

(S501 to S506)

Since steps S501 to S506 are the same processing as those in the first embodiment, repeated description is omitted. However, the processing proceeds to S707 after S506.

(S707)

The sample dispensing unit 103 discharges the sample 143 to the reaction container 108 and then rises. The measurement portion 138 measures the quantity of light during rising of the sample dispensing unit 103, and outputs a detected signal to the control unit 133. The control unit 133 calculates the amount of the sample 143 remaining in the dispensing tip 104, i.e., the remaining amount, based on the changes in the detected signal over time output from the measurement portion 138. For example, Formula 1 is used to calculate the remaining amount.

(S708)

The control unit 133 determines whether the remaining amount of the sample 143 calculated in S707 is appropriate. If the amount is appropriate, the process proceeds to S507, and if not, the process proceeds to S508. Whether the remaining amount is appropriate is determined by whether the remaining amount of the sample 143 calculated in S707 is equal to or less than a predetermined allowable amount. In other words, if the remaining amount is equal to or less than the allowable amount, the amount is determined to be appropriate, and if the remaining amount exceeds the allowable amount, the amount is determined to be not appropriate.

(S507 to S508)

Since steps S507 to S508 are the same processing as those in the first embodiment, repeated description is omitted. However, a process may be added in S508 such that the reaction container 108, to which the sample has been discharged, is discarded so as not to be subjected to analysis.

According to the described processing flow, it is possible to check the amount of the sample 143 aspirated by the sample dispensing unit 103, and to check the remaining amount of the sample in the dispensing tip 104 that has discharged the sample 143. Further, if the checked amount and remaining amount of the sample 143 are each not appropriate, analysis can be reperformed.

Since the measurement portion 138 is disposed on the movement path of the sample dispensing unit 103, the amount and remaining amount of the sample 143 can each be checked without stopping the operation associated with dispensing of the sample. After discharging the sample 143, the dispensing tip 104 is discarded into the disposal hole 112, and thus the measurement portion 138 may be provided on the disposal hole 112 to check the remaining amount of the sample 143 immediately before being discarded.

Third Embodiment

In the first embodiment, it has been described that the amount of the sample 143 in the dispensing tip 104 is measured by the measurement portion 138 provided on the incubator 118. The disposed place of the measurement portion 138 is not limited to on the incubator 118. The third embodiment is described with a case where the measurement portion 138 is provided on the sample container 102 mounted in the sample rack 101 where the sample is aspirated. The third embodiment is the same as the first embodiment except for the disposed place of the measurement portion 138 and the flow of processing, and thus repeated description is omitted.

An exemplary configuration including the measurement portion 138 disposed on the sample container 102 mounted in the sample rack 101 is described with reference to FIG. 8. As in the first embodiment, the measurement portion 138 has the light irradiation portion 140 and the light detection portion 141, which are supported by the U-shaped supporting portion 144 so as to be opposed to each other. In the third embodiment, the passing hole 139 is not provided in the bottom of the supporting portion 144, and the measurement portion 138 is disposed such that the supporting portion 144 shows a U shape when viewed from the vertical direction, so that the probe of the sample dispensing unit 103 passes between the U shape.

An exemplary flow of processing of the third embodiment is described for each step with reference to FIG. 9. Steps S501 to S503 and S505 to S508 are the same processing as those in the first embodiment, and repeated description is omitted. However, S503 is moved to between S505 and S506, S901 is added between S501 and S502, and S902 is added after S502. The newly added S902 and S904 are now described.

(S901)

The sample dispensing unit 103 rotationally transfers to the position where the sample is aspirated in S501, i.e., the position of the sample container 102 mounted in the sample rack 101, and then descends. The measurement portion 138 measures the quantity of light during descending of the sample dispensing unit 103, and outputs a detected signal to the control unit 133. The control unit 133 receives the detected signal output from the measurement portion 138 from time to time and records the signal as changes in the detected signal over time. The changes in the detected signal over time recorded in this step is obtained by measuring the quantity of light passing through the dispensing tip 104 containing no sample 143, and indicates the quantity of light absorbed by the dispensing tip 104 itself.

(S902)

The sample dispensing unit 103 aspirates the sample in S502 and then rises. The measurement portion 138 measures the quantity of light during rising of the sample dispensing unit 103, and outputs a detected signal to the control unit 133. The control unit 133 receives the detected signal output from the measurement portion 138 from time to time and records the signal as changes in the detected signal over time. The changes in the detected signal over time recorded in this step are obtained by measuring the quantity of light passing through the dispensing tip 104 storing the sample 143, and indicates the quantity of light absorbed by the dispensing tip 104 and the sample 143.

The control unit 133 calculates the amount of the sample 143 to be stored in the dispensing tip 104 based on the changes in the detected signals over time recorded in S901 and S902. To calculate the amount of sample 143, used is a difference between the two temporal changes, which is calculated by reversing the time axis of either one of the two temporal changes, and then matching the passage time of the tip end 104A between the two. Since the calculated difference corresponds to changes in the detected signal over time, which represent the quantity of light absorbed only by the sample 143, the amount of the sample 143 can be calculated more accurately even when there are individual differences in absorption of light by the dispensing tip 104.

According to the described processing flow, it is possible to more accurately check the amount of the sample 143 aspirated by the sample dispensing unit 103. Since the measurement portion 138 is disposed on the movement path of the sample dispensing unit 103, the amount of the sample 143 can be checked without stopping the operation associated with dispensing of the sample. Further, in the third embodiment, whether the amount of the sample 143 is appropriate can be determined immediately after the sample dispensing unit 103 aspirates the sample 143, and if the amount is not appropriate, the processing proceeds to the subsequent step while the dispensing tip 104 is discarded without moving the sample dispensing unit 103 to the sample dispensing position 120, and thus the analysis process can be further shortened. Note that S901 is not necessarily essential, and the amount of the sample 143 may be checked using only the changes in the detected signal over time recorded in S902.

As described above, several embodiments of the invention have been described. The invention is not limited to the above-described respective embodiments, and each component may be modified or altered within the scope without departing from the gist of the invention. For example, an imaging device having a plurality of detection elements may be used as the light detection portion 141. In the case of such an imaging device, instead of using changes in a detected signal over time, image processing may be performed on a transmission image of the dispensing tip 104 to calculate the amount of the sample 143. In addition, the storage portion to store the sample aspirated by the sample dispensing unit 103 may be any appropriate component without being limited to the dispensing tip 104. The plurality of components disclosed in the embodiments may be combined as appropriate. Further, some components may be eliminated from all the components shown in the embodiments.

REFERENCE SIGNS LIST

100: rack conveyance path
101: sample rack
102: sample container
103: sample dispensing unit
104: dispensing tip
104A: tip end
105: expendable item conveyance portion
108: reaction container
109: tray
111: tip mounting position
112: disposal hole
113: reagent dispensing unit
114: reagent disk
115: reagent container
116: reagent aspiration position
118: incubator
120: sample dispensing position
122: reagent dispensing position
123: reaction liquid aspiration position
130: analysis unit
132: reaction liquid aspiration portion
133: control unit
136: turning track
137: cover
138: measurement portion
139: passing hole
140: light irradiation portion
141: light detection portion
142: irradiation light

143: sample
143A: liquid level
144: supporting portion
148: display portion

The invention claimed is:

1. An automatic analyzer that analyzes a sample, the automatic analyzer comprising:
    an incubator which holds a reaction container in which a liquid mixture of the sample and a reagent is accommodated;
    a sample dispensing unit including a dispensing tip, which dispenses the sample by aspirating the sample from a sample container in which the sample is accommodated, stores the aspirated sample in a storage portion of the dispensing tip and then discharges the sample to the reaction container; and
    a measurement portion which measures the amount of sample in the storage portion on the basis of a detected signal obtained by detecting light passing through the storage portion while irradiating the storage portion with light, wherein
    the measurement portion is caused to measure the amount of sample in the storage portion again after discharging the sample to the reaction container when the amount of sample measured by the measurement portion is less than a threshold amount, and
    the measurement portion is disposed on the incubator.

2. The automatic analyzer according to claim 1, wherein the measurement portion is disposed on a movement path of the storage portion.

3. The automatic analyzer according to claim 1, wherein the sample is not discharged to the reaction container when the amount of sample measured by the measurement portion is greater than or equal to the threshold amount.

4. The automatic analyzer according to claim 1, wherein the discharged sample is not analyzed when the amount of sample measured again after discharging the sample to the reaction container exceeds the threshold amount.

5. The automatic analyzer according to claim 2, wherein the measurement portion is disposed on the sample container.

6. The automatic analyzer according to claim 5, wherein the aspirated sample is discarded when the amount of sample measured by the measurement portion is greater than or equal to the threshold amount.

7. The automatic analyzer according to claim 2, wherein the measurement portion measures the amount of sample in the storage portion on the basis of changes in the detected signal over time obtained during movement of the storage portion.

8. An automatic analyzer that analyzes a sample, the automatic analyzer comprising:
    an incubator which holds a reaction container in which a liquid mixture of the sample and a reagent is accommodated;
    a sample dispensing unit including a dispensing tip, which dispenses the sample by aspirating the sample from a sample container in which the sample is accommodated, stores the aspirated sample in a storage portion of the dispensing tip and then discharges the sample to the reaction container; and
    a measurement portion which measures the amount of sample in the storage portion on the basis of a detected signal obtained by detecting light passing through the storage portion while irradiating the storage portion with light, wherein the measurement portion is disposed on a movement path of the storage portion, and measures amount of the sample in the storage portion that is moving on the movement path, and wherein the measurement portion is disposed on the incubator.

9. The automatic analyzer according to claim 8, wherein the sample is not discharged to the reaction container when the amount of sample measured by the measurement portion is greater than or equal to a threshold amount.

10. The automatic analyzer according to claim 8, wherein the measurement portion is caused to measure the amount of sample in the storage portion again after the sample is discharged to the reaction container when the amount of sample measured by the measurement portion is less than a threshold amount.

11. The automatic analyzer according to claim 10, wherein the discharged sample is not analyzed when the amount of sample measured again after the sample is discharged to the reaction container exceeds the threshold amount.

12. The automatic analyzer according to claim 8, wherein the measurement portion is disposed on the sample container.

13. The automatic analyzer according to claim 12, wherein the aspirated sample is discarded when the amount of sample measured by the measurement portion is greater than or equal to the threshold amount.

14. The automatic analyzer according to claim 8, wherein the measurement portion measures the amount of sample in the storage portion on the basis of changes in the detected signal over time obtained during movement of the storage portion.

* * * * *